United States Patent
Ueda et al.

[15] 3,678,822
[45] July 25, 1972

[54] SHUTTER MECHANISM CONTROL CIRCUITRY

[72] Inventors: Hiroshi Ueda, Nara; Kintaro Yata, Ikeda; Motonobu Matsuda, Sakai, all of Japan

[73] Assignee: Minolta Camera Kabushiki Kaisha, Osaka, Japan

[22] Filed: June 2, 1970

[21] Appl. No.: 42,726

[30] Foreign Application Priority Data

June 10, 1969 Japan..................................44/45545
June 10, 1969 Japan..................................44/45546

[52] U.S. Cl. .........................................95/10 CT, 95/53 EA
[51] Int. Cl. ..................................................G03b 7/08
[58] Field of Search..............................95/53 E, 53 EA, 10 C

[56] References Cited

UNITED STATES PATENTS

| | | |
|---|---|---|
| 3,324,779 | 6/1967 | Nobusawa et al. .................95/10 C X |
| 3,504,611 | 4/1970 | Richter et al. .................95/53 EA UX |
| 3,362,310 | 1/1968 | Kitai..................................95/53 EA X |

*Primary Examiner*—Samuel S. Matthews
*Assistant Examiner*—Michael L. Gellner
*Attorney*—Watson, Cole, Grindle & Watson

[57] ABSTRACT

At least two timing circuits, one of which is responsive to the light intensity of the object and another of which is set at a fixed delay, are actuated simultaneously to control the opening and closing of a shutter or curtain mechanism in a through-the-lens type measuring system. One of the timing circuits is used to open the shutter mechanism and another timing circuit controls the closing of the shutter mechanism. A third timing circuit may be added which has a constant delay equal to that of the another timing circuit and actuates the shutter opening mechanism after an elapsed time interval. The three timing circuits are connected in a series-parallel manner to effect the proper addition and subtraction of their respective time intervals.

9 Claims, 8 Drawing Figures

FIG. 6
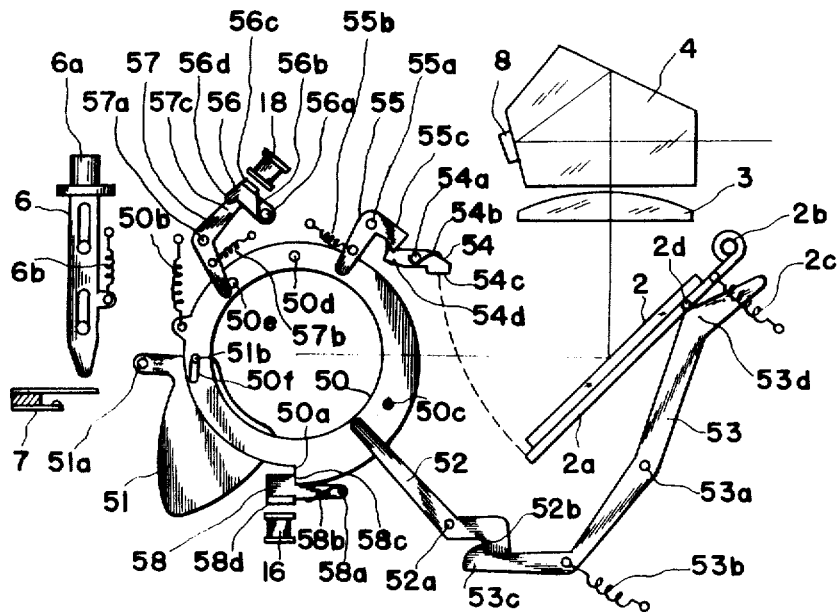
FIG. 7
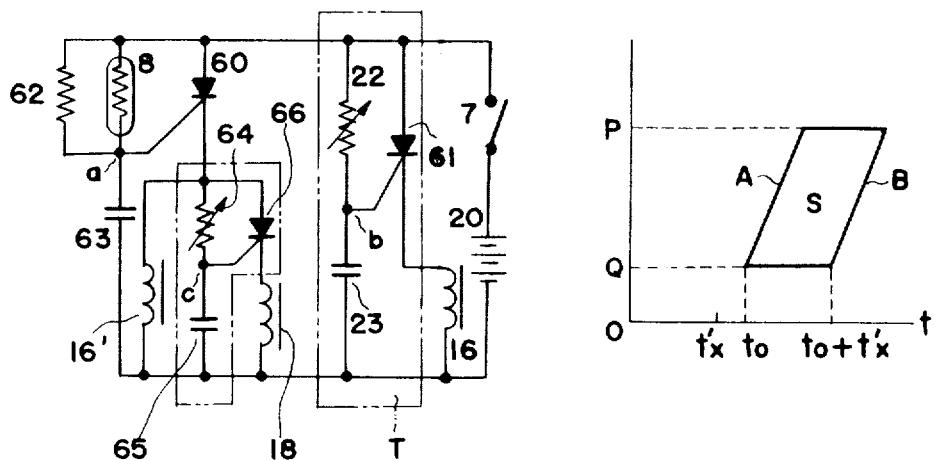
FIG. 8

SHUTTER MECHANISM CONTROL CIRCUITRY

BACKGROUND OF THE INVENTION

In a T.T.L. photometric camera for measuring a portion of the light rays transmitted through a projection lens the movable mirror rotates before the shutter opening and closing member operates and it therefore is impossible to measure the light at that juncture. Therefore, it is necessary to measure the lightness of the object before the shutter opening and put it in a memory.

Various prior art storage means such as mechanical, electromechanical, are known, however, the former are complex in and unreliable, and the latter have insufficient high precision for storing the electric quantity or magnetic quantity determining the brightness of comprehensive objects.

SUMMARY OF THE INVENTION

The drawbacks in the prior art, the present invention makes use of a preset timing circuit instead of memory means and is provided with a photometric circuit including a photoelectric conversion element and both circuits are initiated simultaneously with the shutter release operation. The preset timing circuit determines either the opening operation or the closing operation of the shutter opening and closing member. That is, the closing operation is started at the time when the time corresponding to the lightness of an object is measured by the photometric circuit relative to the time interval established by the preset timing circuit. Or, in another embodiment the closing operation is started at the time when the time established by the photometric circuit is added to the time established by a preset timing circuit.

The primary object of the present invention is to provide an electric shutter for a T.T.L. photometric camera which starts the opening and closing operations of the shutter opening and closing member from signals generated by the electric shutter having a photometric circuit and at least one preset timing circuit the operations of which circuits are initiated by the shutter release operation.

A feature of the present invention is an electric shutter for a camera in which a preset timing circuit actuated by the release operation starts either the shutter opening operation or the shutter closing operation on the basis of a preset time interval, and the photometric circuit starts the other operation in accordance with the time corresponding to the brightness of the object.

Another feature of the present invention is to provide an electric shutter for a T.T.L. photometric camera, in which the preset timing circuit is started simultaneously with the release operation to initiate the closing operation of the shutter opening and closing member after a basic time interval, and the photometric circuit measures the time corresponding to the brightness of the object relative to the basic time interval and starts the opening operation of the shutter opening and closing member at the time interval determined by the difference of the basic time interval and the photometric time interval.

A further feature of the present invention is to provide an electric shutter for a T.T.L. photometric camera, in which the preset timing circuit is started simultaneously with the release operation to initiate the opening operation of the shutter opening and closing member after a basic time interval, and the photometric circuit measures the time corresponding to the brightness of the object and starts the closing operation of the shutter opening and closing member at the time when the photometric measured time is added to the basic time interval.

BRIEF DESCRIPTION OF THE DRAWINGS

FIG. 6 is a plan view showing the constitution of the important part of a camera of a third embodiment in which the present invention is applied to the lens shutter.

FIG. 7 is a wiring diagram of another electric control circuit in accordance with the present invention.

FIG. 8 is a diagram showing the shutter operation as a function of time as controlled by the electric control circuit shown in FIG. 6.

DESCRIPTION OF THE PREFERRED EMBODIMENT

Figure 1:
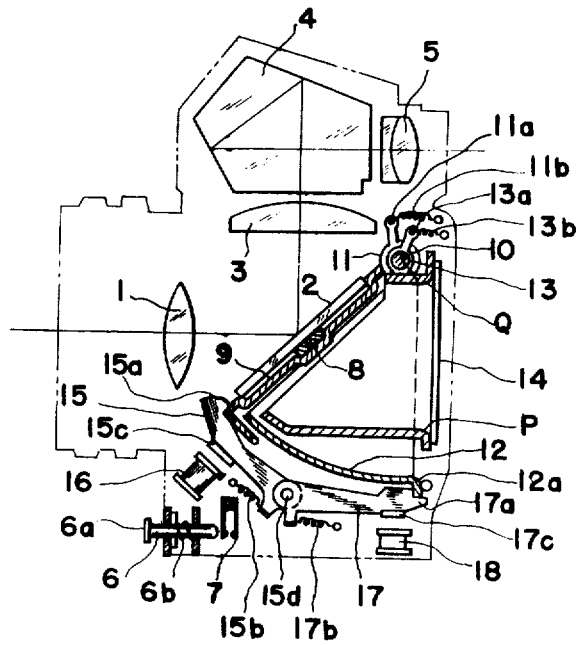
FIG. 1 is a side view in longitudinal section of a camera provided with a mirror shutter type electric shutter in the first embodiment in accordance with the present invention.

With respect to FIG. 1, light rays from projection lens 1 are reflected by mirror 2 and form an image on condenser lens 3 serving also as a focusing glass, and diffused light rays thereof are reflected by pentagonal prism 4 to eyepiece 5. A portion of mirror 2 is transparent, and photoconductive element 8 on the back of the transparent portion of mirror 2 is held on movable frame 9 connected rotatably together with mirror 2 by pin 10.

Figure 4:
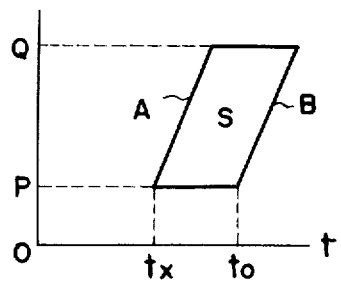
FIG. 4 is a diagram showing the shutter operation as a function of time in the embodiment shown in FIG. 2.

Movable frame 9 is biased clockwise by opening driving member 11 having arm 11a which is pulled by spring 11b and restrained by opening restraining lever 15 described hereinafter. And, by releasing opening restraining lever 15 movable frame 9 is rotated clockwise so as to expose photosensitive film 14 to light from P to Q as shown in FIG. 4.

Whereas, screen plate 12 of the shutter closing member for screening film 14 is connected to pin 10, and closing driving member 13 thereof biases screen plate 12 through arm 13a thereof pulled by spring 13b in a clockwise direction. Screen plate 12 is restrained against clockwise rotation by closing restraining lever 17 engaging bent portion 12a as described hereinafter.

Release rod 6 extends outwardly from the camera by spring 6b, and or one end thereof release button 6a is formed and the other end thereof faces main switch 7.

Opening restraining lever 15 is connected rotatably to pin 15d and 15 and clockwise by spring 15b. And, restraining pawl 15a is provided on the tip of opening restraining lever 15 engages with the lower end of movable frame 9 as shown in FIG. 1 to restrain the mirror in a 45° sloping position against movable frame 9. Armature 15c provided on the back face of restraining lever 15 faces electromagnet 16 for releasing restraining lever 15.

Closing restraining lever 17 connected to pin 15d is biased counterclockwise by spring 17b, and restraining pawl 17a thereof engages with bent portion 12a of screen frame 12 as described above to restrain it against clockwise rotation. Armature 17c provided fixedly on the back face of restraining pawl 17a faces electromagnet 18 for releasing closing restraining lever 17.

Figure 2:
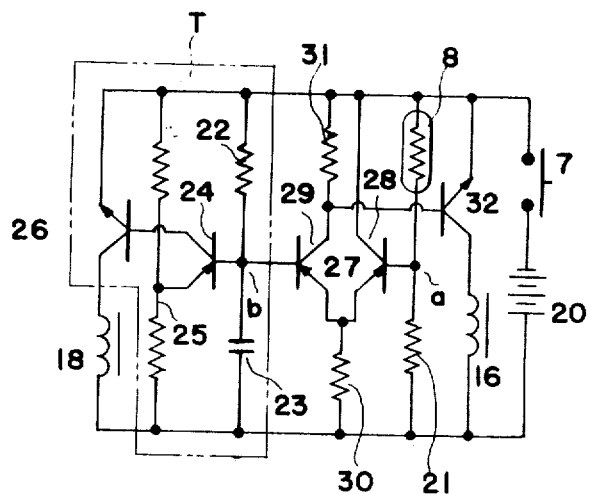
FIG. 2 is a wiring diagram of the electric control circuit for the embodiment shown in FIG. 1.

The electric control circuit for operating the above described structure is shown in FIG. 2, wherein to electric power source 20 and main switch 7 there are connected in parallel a preset timing circuit, a driving circuit for closing restraining release electromagnet 18 and actuated by the preset timing circuit after a preset time interval, and a circuit for detecting the brightness of an object. Differential amplifier circuit 27 compares the output of the object brightness detecting circuit with the output of the present timing circuit. A driving circuit opens restraining release electromagnet 16 and is actuated by the output of differential amplifier circuit 27.

The preset timing circuit is composed of serially connected constant resistance 22 and condenser 23, and connection point $b$ therebetween is connected to the base of transistor 24. The collector of transistor 24 is connected to the base of transistor 26 in the driving circuit and the collector thereof is connected to closing restraining release electromagnet 18.

The object brightness detecting circuit is composed of serially connected photoconductive element 8 and resistance 21 and connection point a therebetween is connected to differential amplifier circuit 27. Differential amplifier circuit 27 is composed of two transistors 28, 29 connected in parallel with each other, and the base of transistor 28 is connected to point a and the base of transistor 29 is connected to point b. The emitters of both transistors 28, 29 are connected to common bias resistance 30 and the collector of transistor 29 is connected to resistance 31 and to transistor 32 in the driving circuit for opening the restraining release. Opening restraining release electromagnet 16 is connected to the collector of transistor 32.

In the embodiment shown in FIG. 1, therefore, by pushing release button 6a, release rod 6 closes main switch 7 and the object brightness detecting circuit generates a voltage in accordance with the object brightness at point a. And, at the same time, the preset timing circuit starts to charge condenser 23 in accordance with the current running through constant resistance 22. And further, differential amplifier circuit 27 compares the voltage at point a with the voltage at point b, and when the voltage at point b drops to the voltage at point a, transistor 32 is operated at point $tX$ shown in FIG. 4. Opening restraining release electromagnet 16 is actuated to attract opening restraining lever 15 to turn it counter-clockwise and release movable frame 9, so that movable frame 9 springs away from opening driving member 11 to start exposure from P toward Q as shown by line A in FIG. 4.

Simultaneously therewith, condenser 23 charges and when the voltage at point b drops below the voltage established by resistance circuit 25, transistor 24 is operated to actuate transistor 26, and closing restraining release electromagnet 18 is excited to attract closing restraining lever 17 to turn it clockwise and screen frame 12 is turned clockwise to close the shutter as shown by line B in FIG. 4.

As described above, in this embodiment the preset timing circuit starts the shutter closing member, namely, screen plate 12 after a certain time elapses subsequent to the release operation, whereas differential amplifier 27 starts the shutter opening member, namely, mirror movable frame 9 at the time $t_r$ corresponding to the object brightness, and the proper exposure shown by S in FIG. 4, which corresponds to the object brightness for the time $t_o - t_r$, is effected.

Figure 3:
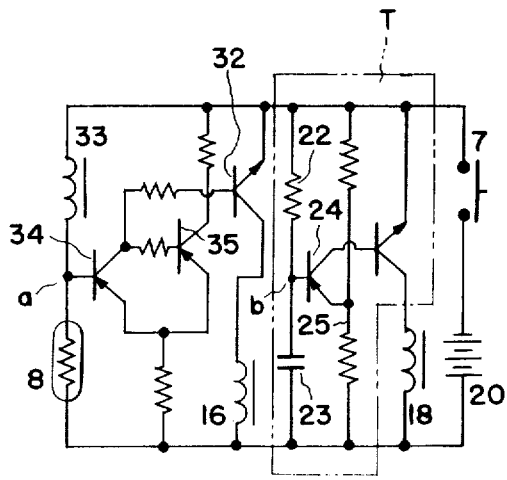
FIG. 3 shows a modified example of the electric control circuit in the embodiment shown in FIG. 2.

FIG. 3 shows a modified example of the electric control circuit, wherein a comparison circuit is not provided and the same preset timing circuit as that shown in FIG. 2 starts closing restraining release electromagnet 18 at $t_o$, whereas the photometric circuit is formed into a circuit set so as to start opening restraining release electromagnet 16 at time $t_r$. The potential at connection point a between photoconductive element 7 and inductance 33 connected in series therewith is increased gradually from zero by the closing of main switch 7. And, the larger the resistance value of photoconductive element 7, namely, the darker the object brightness, the faster the voltage increases, and the lighter the object brightness, the slower the voltage increases. And, when a certain potential is attained transistor 34 is actuated and accordingly transistor 32 is operated to actuate opening restraining release electromagnet 16. Therefore, by properly establishing the values of inductance and resistance in the photometric circuit and the values of capacitance and resistance in the preset timing circuit, time $t_o - t_r$ can be effected as the proper exposure corresponding to the object brightness.

Figure 5:
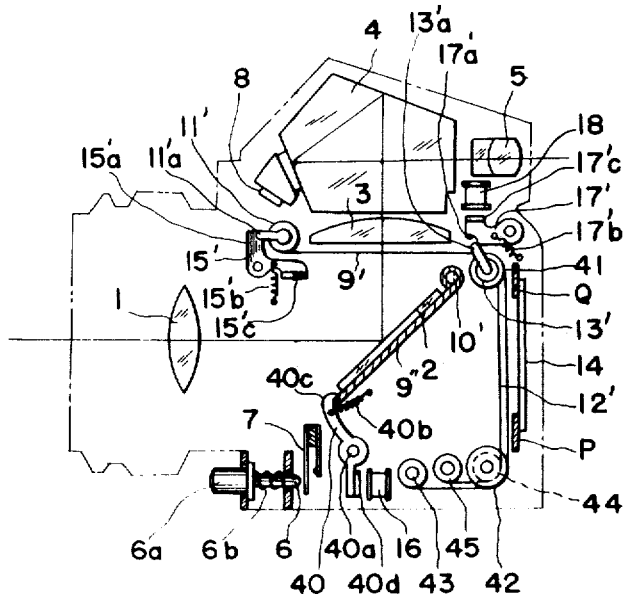
FIG. 5 is a side view in longitudinal section of a camera in accordance with a second embodiment in which the present invention is applied to a focal plane type shutter.

FIG. 5 shows the embodiment of the focal plane shutter in accordance with the present invention, and opening screen 9' starts from winding spindle 11' and is wound around opening screen take-up spindle 43 passing over turning roller 41, exposure window QP, and turning roller 42. And, closing screen 12' starts from winding spindle 13' and is wound around take-up spindle 45 passing over exposure window-QP and turning roller 44.

Movable frame 9" of reflector 2 is connected to pin 10' and restrained by restraining pawl 40c of mirror restraining lever 40 having a clockwise turning bias from spring 40b and rotates about pin 40a. To the other arm of mirror restraining lever 40 armature 40b is fixed and faces opening restraining release electromagnet 16. One arm 15'c of opening restraining lever 15' is adjacent s spring 15'b, and the restraining pawl 15'a of the other arm of lever 15' engages with restraining arm 11'a of opening screen take-up spindle 11' by means of spring 15'b. And, armature 17'c is fixed to closing screen restraining lever 17' and is restrained by restraining arm 13'a of closing screen take-up spindle 13'. Spring 17'b separates the armature and coil of closing restraining release electromagnet 18.

The control circuits for the embodiment of FIG. 5 are the same as those shown in FIG. 2.

Therefore, by pushing release button 6a main switch 7 is closed and when the potential at point b in the preset timing circuit reaches a predetermined potential at point a in the object brightness detecting circuit opening restraining release electromagnet 16 operates at $t_r$ and mirror movable frame 9' rotates to operate opening screen restraining lever 15' and release winding spindle 11' thereof so as to allow opening screen 9" to travel. And then, at $t_o$ after the proper exposure time corresponding to the object brightness elapses the voltage at point b established by the preset timing circuit actuates closing restraining release electromagnet 18.

FIG. 6 shows the embodiment of the lens shutter in accordance with the present invention, to help explain its operation the shutter mechanism is shown by a front view and the mirror mechanism is shown by a side view. Shutter operation ring 50 is biased clockwise by spring 50b having restraining step 50a, mirror operation pin 50c, opening driven pin 50d, closing driven pin 50e, and long slit 50f. As to long slot 50f only one thereof is shown in FIG. 6 but the number thereof is the same as the number of the shutter blades, and pin 51 on shutter blade 51 is fitted in long slot 50f. And, restraining step 50a engages with pawl 58c of restraining lever 58 connected to pin 58a by the face force by spring 58b, and armature 58d fixed to said restraining lever 58 faces opening restraining release electromagnet 16. One end of mirror restraining lever 52 connected to pin 52a faces the clockwise turning track of mirror operation pin 50c, and restraining pawl 52b of the other end of lever 52 engages with restraining pawl 53c of mirror driving lever 53 connected to pin 53a and is biased counter-clockwise by spring 53b. Protrusion 53 d of mirror driving lever 53 comes into contact with pin 2d on movable frame 2a connected to pin 2b and biased by spring 2c.

Face 54c of opening restraining lever 54 is connected to pin 54a and biased clockwise by spring 54b faces the turning track of movable frame 2a, and restraining pawl 54d of the other end of lever 54 engages with pawl 55c of opening driving lever 55 connected to pin 55a and having a clockwise turning tendency through strong spring 55b. The other arm of opening driving lever 55 faces the turning track of opening driven pin 50d.

Closing restraining lever 56 is connected to pin 56a and biased counter-clockwise by spring 56b and is provided with restraining pawl 56d which engages with pawl 57c of closing driving lever 57, and when armature 56c is rotated by closing restraining release electromagnet 18 against spring 56b, the engagement of the pawl members is released.

One arm of closing driving lever 57 is connected to pin 57a and biased counter-clockwise by strong spring 57b faces the turning track of closing driving pin 50e.

The control circuits for both electromagnetic coils are formed in the same way as those shown in FIG. 2.

By pushing release button 6a against spring 6b main switch 7 is closed, the preset timing circuit is operated, condenser 23 is charged, and when the potential at point b equals the potential at point a in the object brightness detecting circuit, electromagnet 16 operates, restraining lever 58 is rotated counter-clockwise, shutter operation ring 50 is rotated clockwise by spring 50b, and blade 51 is closed from its opening state for measuring light and observing images. Mirror operation pin 50c engages with mirror restraining lever 52 because of the aforesaid rotation to rotate counter-clockwise, and mirror driving lever 53 pushes up movable frame 2a by means of pin 2d, and just as movable frame 2a rotates opening restraining lever 54 counter-clockwise, opening driving lever 55 is rotated clockwise by strong spring 55b to rotate counter-clockwise opening driven pin 50d located in the clockwise turning position shown by a broken line and thus shutter blade 51 is opened.

Next, at $t_o$ soon after the interval established by preset timing circuit electromagnet 18 is operated, closing restraining lever 5b is rotated clockwise, and closing driving lever 57 is released to rotate counter-clockwise by means of spring 57b so as to push closing driving pin 50e to rotate shutter operation ring 50 clockwise and close shutter blade 51.

In the electric control circuit shown in FIG. 7, to power source 20 and main switch 7 there are connected in parallel with each other the photometric circuit, a first preset timing circuit, the circuit for opening restraining release electromagnet 16 actuated by the output of the photometric circuit, a second preset timing circuit actuated by the output of the photometric circuit and the circuit for closing restraining release electromagnet 18 actuated by the output of the first preset timing circuit.

The photometric circuit is composed of photoconductive element 8 and correction resistance 62 connected in parallel with element 8, and condenser 63 connected in series therewith, and connection point $a$ is connected to the gate of SCR 60 connected in series to the second preset timing circuit. The first preset timing circuit is composed of a series connected variable resistance 22 and condenser 23, and connection point $b$ is connected to the gate of SCR 61 connected in series to opening restraining release electromagnet 16. The second preset timing circuit connected to SCR 60 is composed of a series connected variable resistance 64 and condenser 65, and connection point $c$ is connected to the gate of SCR 66 connected to SCR 60 and closing restraining release electromagnet 18 and thus forms an addition circuit. And, the time delay elements of the first and second preset timing circuits are set up to be equal with each other.

Just as main switch 7 is closed by the release operation, the first preset timing circuit and the photometric circuit are actuated at the same time, and at $t_o$ in FIG. 8 soon after the interval established by the first preset timing circuit measures, SCR 61 is turned ON to operate electromagnet 16 and thus the shutter opening operation is initiated. Then, just as the photometric circuit measures proper exposure time $t'_x$ corresponding to the object brightness, SCR 60 is turned ON to operate the second preset timing circuit, and after time $t_o$, SCR 66 is turned On to operate electromagnet 18 and close the shutter. That is, at $t_o$ the shutter is closed and at $t_o+t'_x$ for which the proper exposure time corresponding to the object brightness measured by the photometric circuit is provided by the addition circuit, the shutter closing is started and the exposure time is as follows:

$$(t_o+t'_x)-(t_o)=t'_x$$

Also in this electric control circuit as well as the embodiment shown in FIG. 5 and FIG. 6 the time required to effect the turning of mirror or the temporary closing of blades from the operation of opening restraining release electromagnet 16 to the actual start of the shutter operation must be considered, however, if that time is constant the circuit constant values can be selected in order that it is added to $t'_x$ in the above formula.

However, the time required to effect the turning of the mirror or the temporary closing of the blades can not always be fixed because of the position of a camera. Therefore, in FIG. 7 electromagnet 16' for starting the actual shutter opening member is provided in series with SCR 60 and it is also possible to allow electromagnet 16 to effect the turning of the mirror or the temporary closing of the blades. In this case, for example, it is possible that opening screen restraining lever 15 shown in FIG. 5 is located outside the turning track of movable frame 9' so as to be operated by electromagnet 16', or opening restraining lever 54 shown in FIG. 6 is located outside the turning track of movable frame 2a so as to be operated by electromagnet 16'.

We claim:

1. A shutter control mechanism for a photographic camera including an exposure control circuit having a photoelectric element for receiving light from an object to be photographed through an objective lens of the camera, comprising:
   a shutter opening member;
   a first member for restraining the opening member in a cocked position thereof;
   a first electromagnetic means for releasing said opening member and actuating shutter opening operation;
   a shutter closing member;
   a second member for restraining said closing member in a cocked position thereof;
   a second electromagnetic means for releasing the closing member and actuating shutter closing operation;
   a first timing circuit having a delay period determined by the light incident on the photoelectric element and electrically connected to said first electromagnetic means for actuating the latter after the lapse of said delay period;
   a second timing circuit having a constant delay period and connected electrically to said second electromagnetic means for actuating the latter after the lapse of the constant delay period;
   a manually operated switch means for actuating said timing circuits simultaneously; and
   an electric power source to which said two timing circuits are connected in parallel with each other through said switch means, said constant delay period is set longer than said delay period of the first timing circuit.

2. A shutter control mechanism as in claim 1, wherein said first timing circuit includes an inductance and a photoconductive element connected in series with each other, and a first switching circuit connected between said photoconductive element and said inductance and said first electromagnetic means; the second timing circuit including a fixed resistance and a condenser connected in series with each other, and a second switching circuit connected between said condenser and resistance and said second electromagnetic means.

3. A shutter control mechanism as in claim 1 further comprising:
   a delay circuit having a fixed resistance and a condenser connected in series with each other;
   a first switching circuit having an input terminal connected between said fixed resistance and said condenser, and an output terminal connected to said second electromagnetic means;
   a voltage divider having an ohmic resistance and a photoconductive element connected in series with each other;
   a differential amplifier circuit having two input terminals, one of which is connected between said ohmic resistance and said photoconductive element, the other input terminal is connected between said condenser and said fixed resistance, and an output terminal; and
   a second switching circuit having an input terminal connected to said output terminal, and an output terminal connected to said first electromagnetic means.

4. A shutter mechanism as in claim 1, wherein:
   said shutter opening member is a front shutter curtain;
   said shutter closing member is a rear shutter curtain;
   said second member includes a first armature attracted by said second electromagnetic means;
   a reflector movable between a rest position and an operating position; and
   a third member for restraining said reflector in said rest position and including a second armature attracted by said first electromagnetic means for releasing the restraint of said reflector, said first member is mounted in the camera so that the restraint of the first member is released in response to the movement of said reflector to the operating position thereof.

5. A shutter mechanism as in claim 1, comprising;
a blade means as the lens shutter;
an operating ring movable between a first position for opening said blade means and a second position for closing said blade means;
said first member restrains said operating ring in said first position and including a first armature fixed thereon to be attracted by said first electromagnetic means;
a reflector movable between a rest position and an operating position and biased in said operating position;
said second member restrains said reflector in said rest position, the restraint of the second restraining member is released in response to the movement of said operating ring from said first position to said second position;
a first driving member for driving said operating ring to said first position;
a third member for restraining said first driving member in a cocked position, which restraint is released in response to the movement of said reflector to said operating position;
a second driving member for driving said operating ring to said second position; and
a fourth member for restraining said second driving member in a charged position and including a second armature fixed thereon to be attracted by said second electromagnetic means for releasing the restraint of said fourth member and actuating said second driving member.

6. A shutter mechanism as in claim 1 further comprising;
a third timing circuit having a constant delay period equal to that of said second timing circuit and connected to said first electromagnetic means for actuating said first electromagnetic means after the lapse of said constant delay period, said constant delay period is set longer than said delay period of said first timing circuit;
said manually operated switch means initiates operation of said first and said third timing circuits simultaneously; and
said first and third timing circuits are connected in parallel with each other through said switch means to said power source.

7. A shutter mechanism as in claim 6, wherein
said first timing circuit includes a photoconductive element and a condenser connected in series with each other;
said second timing circuit includes a first silicon control rectifier and a delay circuit having an ohmic resistance and a condenser, a second silicon control rectifier in parallel with said delay circuit and said second electromagnet coil is connected to said first silicon control rectifier and the gate of said second silicon control rectifier is connected between said ohmic resistance and said condenser in said RC delay circuit, the gate of said first silicon control rectifier is connected between said photoconductive element and said condenser in said first timing circuit for actuating said second electromagnetic means; and
said third timing circuit includes a delay circuit having an ohmic resistance and a condenser, and having a delay period equal to that of said delay circuit in said second timing circuit, and a third silicon control rectifier, and said first electromagnetic coil is connected in series with said delay circuit, the gate of said third silicon control rectifier is connected between said ohmic resistance and said condenser for actuating said first electromagnetic means.

8. A shutter mechanism as in claim 4 further comprising;
a third timing circuit having a constant delay period equal to that of said second timing circuit and connected to said first electromagnetic means for actuating said first electromagnetic means after the lapse of said constant delay period, said constant delay period is set longer than said delay period of said first timing circuit;
said manually operated switch means initiates operation of said first and said third timing circuits simultaneously; and
said first and third timing circuits are connected in parallel with each other through said switch means to said power source.

9. A shutter mechanism as in claim 5, further comprising;
a third timing circuit having a constant delay period equal to that of said second timing circuit and connected to said first electromagnetic means for actuating said first electromagnetic means after the lapse of said constant delay period, said constant delay period is set longer than said delay period of said first timing circuit;
said manually operated switch means initiates operation of said first and said third timing circuits simultaneously; and
said first and third timing circuits are connected in parallel with each other through said switch means to said power source.

* * * * *